United States Patent
Lee (10) Patent No.: US 9,726,250 B1
(45) Date of Patent: Aug. 8, 2017

(54) SELF-TIGHTENING AND WEAR COMPENSATING SUSPENSION MOUNTING SYSTEM

(71) Applicant: Fairwind Distribution, LLC, Chandler, AZ (US)

(72) Inventor: Steven David Lee, Kailua, HI (US)

(73) Assignee: Fairwind Distribution, LLC, Chandler, AZ (US)

( * ) Notice: Subject to any disclaimer, the term of this patent is extended or adjusted under 35 U.S.C. 154(b) by 0 days.

(21) Appl. No.: 14/791,072

(22) Filed: Jul. 2, 2015

Related U.S. Application Data (63) Continuation-in-part of application No. 14/135,047, filed on Dec. 19, 2013.

(60) Provisional application No. 61/848,011, filed on Dec. 19, 2012.

(51) Int. Cl.
  *F16F 9/00* (2006.01)
  *F16F 9/54* (2006.01)
  *B60G 15/06* (2006.01)

(52) U.S. Cl.
  CPC .............. *F16F 9/54* (2013.01); *B60G 15/067* (2013.01)

(58) Field of Classification Search
  CPC ..... F16C 11/0604; B60G 7/005; B60G 7/067; B60G 7/068; B62D 7/16
  USPC .......... 188/321.11; 280/134, 124.155, 93.51, 280/124.134; 267/292, 220
  See application file for complete search history.

(56) References Cited

U.S. PATENT DOCUMENTS

| | | | | |
|---|---|---|---|---|
| 2,971,770 A | * | 2/1961 | Wagner | F16C 11/0604 280/124.134 |
| 3,037,787 A | * | 6/1962 | Gottschald | B60G 7/005 267/292 |
| 3,135,540 A | * | 6/1964 | Herbenar | B62D 7/16 280/93.511 |
| 4,779,855 A | * | 10/1988 | Tanaka | B60G 15/068 267/220 |
| 7,448,478 B2 | * | 11/2008 | Thomas | B60G 15/067 188/321.11 |
| 2010/0124455 A1 | * | 5/2010 | Zaloga | B62D 7/16 403/144 |
| 2014/0070512 A1 | * | 3/2014 | Wilson | B60G 11/22 280/124.155 |

* cited by examiner

*Primary Examiner* — Christopher Schwartz
(74) *Attorney, Agent, or Firm* — Booth Udall Fuller, PLC (57) ABSTRACT

A self-tightening and wear-compensating suspension mounting system is described herein. The suspension mounting system may include a housing, a hemispherical race, a hemispherical ball, an elastomeric first bushing, two opposing couplings, and a shock absorber. The housing includes two opposing cavities. The hemispherical race is mounted within a first cavity of the two opposing cavities. The hemispherical ball is slidably mounted at least partially within the hemispherical race. The elastomeric first bushing is positioned at least partially within a second cavity of the two opposing cavities. The two opposing couplings are positioned hold the hemispherical race, the hemispherical ball, and the elastomeric first bushing between the two couplings. The shock absorber shaft extends through the two opposing cavities, the hemispherical race, the hemispherical ball, and the elastomeric first bushing. The hemispherical ball pivots within the hemispherical race responsive to movement of the shock absorber.

15 Claims, 3 Drawing Sheets

SELF-TIGHTENING AND WEAR COMPENSATING SUSPENSION MOUNTING SYSTEM

CROSS REFERENCE TO RELATED APPLICATIONS

This application is a continuation-in-part application of the earlier U.S. Utility Patent Application to Lee entitled "SELF-TIGHTENING AND WEAR-COMPENSATING HEMI-BALL MOUNT," application Ser. No. 14/135,047, filed Dec. 19, 2013, now pending, which claimed the benefit of the filing date of U.S. Provisional Patent Application 61/848,011, entitled "Self-Tightening and Wear Compensating Hemi-Ball Mount" to Lee, which was filed on Dec. 19, 2012, the contents and disclosures of which are all hereby incorporated herein by reference.

BACKGROUND

Technical Field

Aspects of this document relate generally to suspension mounting systems.

Background Art

Conventional suspension mounting systems employ various methods including the use of one or more rubber components such as bushings to secure the end of a shaft such as a shock absorber shaft in automobiles. Rubber bushings may allow undesirable excessive movement, undesirable resistance to pivoting motion and the rubber may wear out, stiffen or otherwise deteriorate over time.

Conventional suspension mounting systems also employ the use of spherical ball bearings, also known as pillow ball mounts or Heim joints. These typically consist of a metal spherical ball that is encapsulated in a metal race. This allows a shaft that is mounted through a hole in the spherical ball to pivot.

These designs also allow the joint and mounts to be load bearing. The benefits of these designs include pivoting of the shaft, and ability to bear a load. These spherical ball bearing design attempt to resolve some of the problems associated with rubber bushings but they have their own set of problems.

In conventional suspension mounting systems, one problem is the metal to metal contact between the spherical ball and the metal race transfer vibration and noise from the shaft to the mounting structures. In the case of automobiles, this transfer of vibration and noise is undesirable and often results in a harsh and uncomfortable ride. Due to the design of the spherical ball and metal race, as the joint and mounts are used over time, the spherical ball and/or the metal race wears and/or loosens thereby allowing excessive movement of the spherical ball within the metal race. This excessive movement results in rattling of the spherical ball within the metal race. This is very undesirable in an automobile in which comfort and quietness are paramount. The prior art has attempted to address this excessive movement of the spherical ball in various ways, such as: over tightening the metal race of the spherical ball, or using Teflon lining of the metal race. These two methods provide limited improvement and, while they may provide longer operational life, they may still experience excessive wear resulting in excessive movement of the spherical ball within the metal race resulting in rattling.

Problems associated with the spherical ball or pillow ball mount include one or more of the following. The metal-to-metal design of the ball and race transfers vibrations and noise from the shaft through the metal ball and metal race and on to the devices that they are mounted to. They typically require an assembly to encapsulate the spherical ball in the metal race, which typically requires additional hardware such as threaded metal components to hold the ball and race assembly together; when used for securing automobile shock absorber shafts, the metal ball must be restricted in size to fit within the metal race which is contained within other components. The metal ball has a hole going through its center to accommodate the shaft of the shock absorber. This results in the relatively small ball carrying most of the load from the vehicle on the outside portion of the ball's outer spherical surface. This arrangement results in much higher stress on the wearing surface of the relatively small ball and results in wear of the ball and the race. The design utilizes metal components such as hardened steel balls and hardened steel races that require great precision in manufacture and are costly to manufacture. The assembly is labor intensive to manufacture due to the precise fitment and tension required to properly fit the metal ball within the metal race. The ball and race develop wear and require replacement from time to time. The spherical ball and race typically are not field-serviceable and normally require a complete replacement of the assembly when excessive wear has occurred. The labor required to replace the ball and race assembly may be very costly depending on the installation. This labor may cost many times the cost of the replacement parts.

Among conventional suspension mounting systems is an Eibach design for automotive shock absorbers, which consists of a plastic hemispherical ball and a hemispherical metal race with a rubber bushing and steel washers. This design uses a stationary hemispherical plastic ball mounted onto the vehicle and metal race positioned below the ball with the shock absorber shaft positioned below the metal race. The shock absorber shaft and the metal race pivot upon the stationary ball. A rubber bushing and washer(s) are used to create a preload tension on the end of the shock absorber shaft and to retain the ball and race together.

With the Eibach design, the ball is made of plastic and will wear faster than the metal race that it fits into. When excessive wear to the plastic ball occurs, it may become out-of-round and smaller than the metal race that it fits into. When there is excessive wear of the ball or of the race, a loose fit will develop and rattling and noise may occur. This noise can transfer to the vehicle and is undesirable. The concave wearing surface of the race is facing upward. This makes it susceptible to collecting abrasive contaminants such as road splash and dirt, which can increase the wear upon the plastic ball and the metal race, causing degradation of performance. When the plastic ball wears it no longer has a close tolerance fit to the metal race, and the replacement of the worn plastic ball may be required to restore the proper performance. This design requires substantial space for clearance below the plane of the mounting point due to the metal race being below the plastic hemispherical ball. In order to allow the race and the shock absorber shaft to pivot, the race must be positioned low enough to allow it to have adequate clearance for the race and the shock absorber shaft to pivot on the stationary ball without hitting any other components, such as the mounting plate or the vehicle's other components. This design uses components that must be mounted below the plane of the mounting point. The thickness of the ball and race components will render the comparable length of the shock absorber shaft as unusable. This reduces the effective length of the shock absorber shaft travel and limits the effectiveness of the shock absorber. Many vehicles are designed with limited space and with an optimum amount shock absorber travel. The shock absorber shaft must be allowed to use its full length of travel in order to maximize its effectiveness in absorbing shocks during driving. On many vehicles, using the Eibach system may greatly reduce the amount of shock absorber shaft travel and limit the performance of the shock absorber to the extent that the use of this system may not be practical.

SUMMARY

According to an aspect, a suspension mounting system may comprise a housing comprising a first cavity, a hemispherical race mounted within the first cavity, a hemispherical ball slidably mounted at least partially within the hemispherical race, a first washer proximate the hemispherical ball, wherein the hemispherical ball is sized such that the first washer does not directly contact either the hemispherical race or the housing and a wear gap is formed between the washer and the housing and between the washer and the hemispherical race, and a shock absorber shaft extending through the first cavity of the housing, the hemispherical race, the hemispherical ball, and the first washer, wherein the hemispherical ball pivots within the hemispherical race responsive to movement of the shock absorber.

Particular embodiments of the suspension mounting system may comprise one or more of the following. The first washer may be positioned between a lip on the shock absorber shaft and the hemispherical ball. A second cavity on the housing opposite the first cavity, an elastomeric first bushing positioned at least partially within the second cavity, and a coupling proximate the elastomeric first bushing, wherein the shock absorber shaft extends through the second cavity, the elastomeric first bushing, and the coupling. A coupling may comprise a locking nut. A second washer between the elastomeric first bushing and the locking nut. A second bushing positioned directly between the first washer and the second washer. The shock absorber shaft may extend through the second bushing and the second washer. A cup mounted within the first cavity between walls of the first cavity and the hemispherical race. The hemispherical ball may be formed of a more durable material than the hemispherical race. The hemispherical ball may comprise a metal hemispherical ball, the hemispherical race may comprise a plastic hemispherical race, the housing may comprise a metal housing, the second bushing may comprise a metal second bushing, and the cup may comprise an elastomeric cup. The elastomeric bushing may bias the metal spherical ball against the plastic hemispherical race as the plastic hemispherical race wears down. The hemispherical ball may comprise a metal hemispherical ball, the hemispherical race may comprise a metal hemispherical race, the housing may comprise a metal housing, the second bushing may comprise a metal second bushing, and the cup may comprise an elastomeric cup. The elastomeric bushing may bias the metal spherical ball against the metal hemispherical race as the plastic hemispherical race wears down. The hemispherical ball may comprise a plastic hemispherical ball, the hemispherical race may comprise a plastic hemispherical race, the housing may comprise a metal housing, the second bushing may comprise a metal second bushing, and the cup may comprise an elastomeric cup. The elastomeric bushing may bias the metal spherical ball against the plastic hemispherical race as the plastic hemispherical race wears down.

According to an aspect, a suspension mounting system may comprise a housing comprising two opposing cavities, a hemispherical race mounted within a first cavity of the two opposing cavities, a hemispherical ball slidably mounted at least partially within the hemispherical race, an elastomeric first bushing positioned at least partially within a second cavity of the two opposing cavities, two opposing couplings positioned hold the hemispherical race, the hemispherical ball, and the elastomeric first bushing between the two couplings, and a shock absorber shaft extending through the two opposing cavities, the hemispherical race, the hemispherical ball, and the elastomeric first bushing, wherein the hemispherical ball pivots within the hemispherical race responsive to movement of the shock absorber.

Particular embodiments may comprise one or more of the following. The two opposing coupling may comprise a locking nut threadedly coupled to the shock absorber shaft proximate the elastomeric bushing and a lip on the shock absorber shaft proximate the hemispherical ball. A first washer positioned directly between the lip of the shock absorber shaft and the hemispherical ball. A second washer positioned between the locking nut and the elastomeric first bushing. A second bushing positioned between the first and second washers and extending through the elastomeric first bushing, the housing and the hemispherical ball. The shock absorber shaft may extend through the first washer, the second washer, and the second bushing. The hemispherical ball may be sized such that the first washer does not directly contact the housing or the hemispherical race and a wear gap is formed between the first washer and the housing and between the first washer and the hemispherical race. A cup positioned at least partially within the first cavity between the hemispherical race and walls of the first cavity. The hemispherical ball may be formed of a material that is more durable than material forming the hemispherical race. The hemispherical ball may comprise a metal hemispherical ball, the hemispherical race may comprise a plastic hemispherical race, the housing may comprise a metal housing, the second bushing may comprise a metal second bushing, and the cup may comprise an elastomeric cup. The elastomeric bushing may bias the metal spherical ball against the plastic hemispherical race as the plastic hemispherical race wears down. The hemispherical ball may comprise a metal hemispherical ball, the hemispherical race may comprise a metal hemispherical race, the housing may comprise a metal housing, the second bushing may comprise a metal second bushing, and the cup may comprise an elastomeric cup. The elastomeric bushing may bias the metal spherical ball against the metal hemispherical race as the plastic hemispherical race wears down. The hemispherical ball may comprise a plastic hemispherical ball, the hemispherical race may comprise a plastic hemispherical race, the housing may comprise a metal housing, the second bushing may comprise a metal second bushing, and the cup may comprise an elastomeric cup. The elastomeric bushing may bias the metal spherical ball against the plastic hemispherical race as the plastic hemispherical race wears down.

According to an aspect, a suspension mounting system may comprise a housing comprising a first cavity, a hemispherical race mounted within the first cavity, a hemispherical ball slidably mounted at least partially within the hemispherical race, the hemispherical ball being formed of a material that is harder than a material forming the hemispherical race, a biasing element positioned proximate the housing opposite the first cavity, and a shock absorber shaft extending through the first cavity, the hemispherical race, the hemispherical ball, and the housing, the shock absorber shaft may comprise a first coupling configured to direct the hemispherical ball into the hemispherical race and a second coupling proximate the biasing element, wherein as the hemispherical race wears responsive to friction between the hemispherical race and the hemispherical ball, the biasing element biases the hemispherical ball against the hemispherical race.

In particular embodiments the biasing element may comprise an elastomeric bushing positioned at least partially within a second cavity of the housing.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended suspension mounting system and/or assembly procedures for a suspension mounting system will become apparent for use with implementations of suspension mounting systems from this disclosure. Accordingly, for example, although particular suspension mounting systems are disclosed, such suspension mounting systems and implementing components may comprise any shape, size, style, type, model, version, measurement, concentration, material, quantity, and/or the like as is known in the art for such suspension mounting systems and implementing components, consistent with the intended operation of a suspension mounting system.

Figure 1:
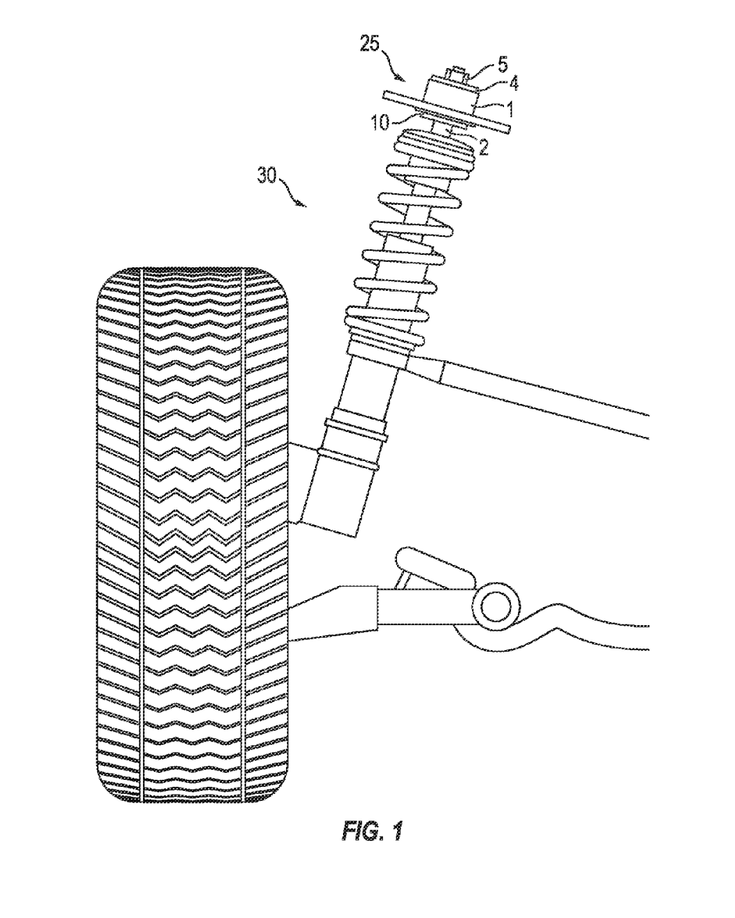
FIG. 1 is a front view of a portion of a wheel assembly utilizing one aspect of a suspension mounting system.

Various embodiments of suspension mounting systems disclosed herein may be used in numerous mechanical applications, including but not limited to vehicles. More specifically, various embodiments may be applied to shock absorbers in automobiles. FIG. 1 depicts a non-limiting embodiment of portion of an automobile comprising a shock absorber system. According to some aspects, the shock absorber system comprises a suspension mounting system 25, a piston system 30, and a coiled spring 31. Other applications of the disclosures of this document include airplanes, helicopters, motorcycles, machines, and so on. Thus, while reference may be made to automobiles or vehicles elsewhere in this document, it is intended that the systems of this disclosure may also be applied to other applications without departing from the scope of this disclosure.

Figure 2:
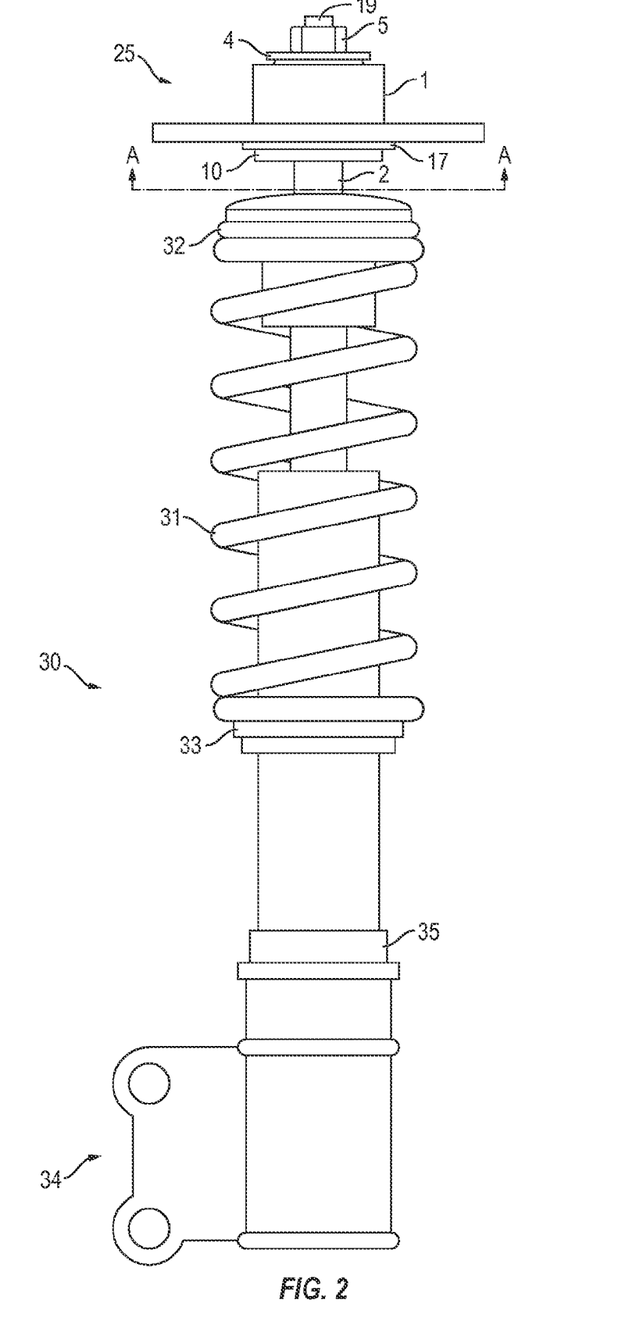
FIG. 2 is a side view of a shock absorber system comprising a suspension mounting system.

FIG. 2 depicts a perspective view of a non-limiting embodiment of a shock absorber system. The shock absorber system typically comprises an embodiment of a suspension mounting system 25 described in greater detail below. Various embodiments of a shock absorber system contemplated as part of this disclosure may further comprise any other aspects of a conventional shock absorber system, such as but not limited a coiled spring 31 and piston assembly 30 that includes an upper seat 32, a lower seat 33, a lock nut 35, and a lower mounting bracket 34. The shock absorber system may comprise a strut assembly comprising a working cylinder, a piston, a stretching valve, an oil storage cylinder, a compression valve, a compensation valve, a passing valve, a guiding holder, a dustproof cover, and/or an oil seal, and the like. One of ordinary skill in the art will understand the use of a strut assembly and/or piston assembly as is commonly used in the art.

Figure 3:
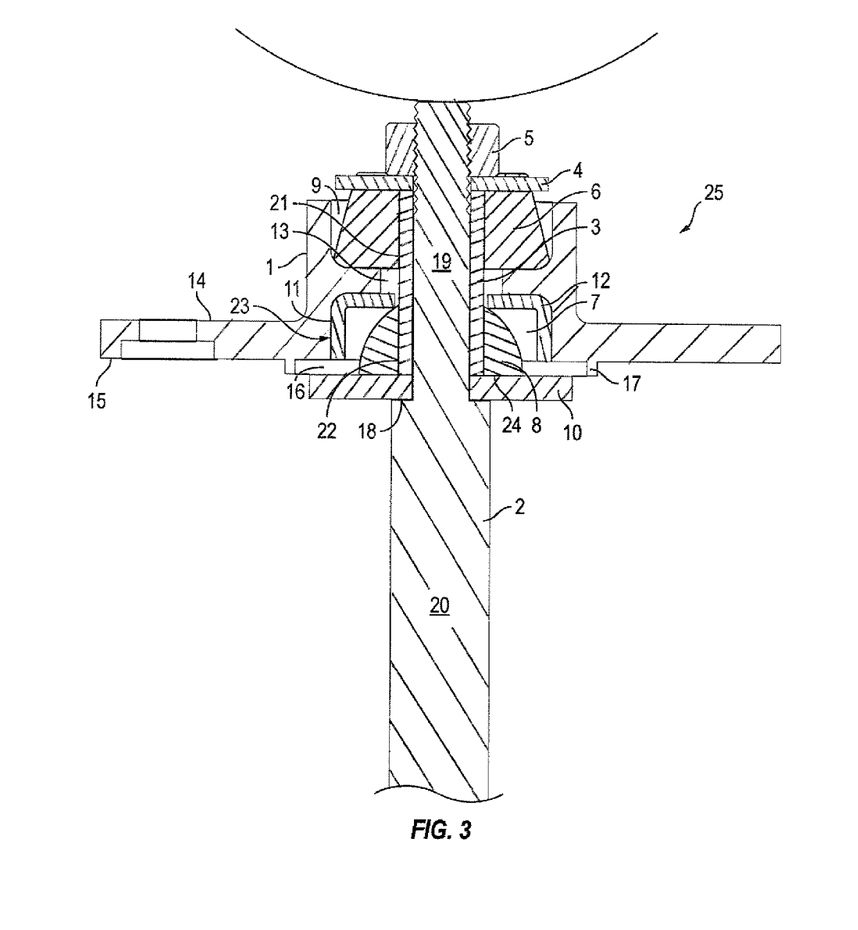
FIG. 3 is cross-sectional view of a suspension mounting system taken along line A-A of FIG. 2.

FIG. 3 depicts a non-limiting embodiment of a suspension mounting system 25 taken along line A-A of FIG. 2. The suspension mounting system 25 depicted in FIG. 3 may be utilized in combination with aspects of conventional mounting system, piston assembly, strut assembly, and the like otherwise known in the art without departing from the scope of this disclosure. In one or more embodiments, a suspension mounting system comprises a housing 1 comprising at least a first cavity 11 on a first or lower surface 15 of the housing 1. The housing 1 may comprise any material known in the art of suspension system housings, including but not limited to metal housing. According to some aspects, the housing is formed integral with the upper strut mount. While the first cavity 11 is typically on the lower surface 15, it is contemplated that the first cavity 11 may be on the upper surface 14 without departing from the scope of this disclosure.

According to some aspects, a suspension mounting system comprises a hemispherical race 7 mounted at least partially within the first cavity 11. The hemispherical race 7 is configured to house at least a portion of a hemispherical ball 8. As such, the hemispherical race 7 typically comprises an arced inner wall complementary to the curvature of a portion of the outer surface of the hemispherical ball 8. The arced inner wall of the hemispherical race 7 may be sized to interface less than half of a sphere, approximately half of a sphere, or more than half of a sphere.

The hemispherical race 7 further comprises outer walls sized and shaped to interface either the first cavity 11 or a cup 12 mounted within the first cavity 11. As shall be discussed in greater detail below, the hemispherical race 7 typically comprises a low friction material that is less durable than the hemispherical ball 8. As such, the hemispherical race 7 is also typically more subject to wear and deformation than the hemispherical ball 8. Example materials of the hemispherical race 7 include, but are not limited to plastics, Teflon, and/or metal. The metal of a hemispherical race 7 may comprise a polished metal or alloy, such as but not limited bronze.

One or more embodiments of a suspension mounting system further comprise a hemispherical ball 8 partially and slidably mounted within the hemispherical race 7. While reference is made to a hemispherical ball 8, it is contemplated that the hemispherical ball 8 may comprise less than half of a sphere, approximately half of a sphere, or more than half of a sphere. In the non-limiting embodiment depict in FIG. 3, the hemispherical ball 8 comprises approximately half of a sphere. The hemispherical ball 8 is typically sized such that when the hemispherical ball 8 interfaces with the hemispherical race 7, a portion of the hemispherical ball 8 extends beyond one or both of the hemispherical race 7 and the lower surface 15 of the housing 1. In other words, the hemispherical ball 8 may be seated in the hemispherical race 7 at a depth that is less than the radius of the hemispherical ball 8.

The hemispherical ball 8 typically comprises a ball opening 22 extending through the hemispherical ball 8 and sized to house therein a portion of a shock absorber shaft 2 and, when present, a portion of a bushing 3. As referenced above, the hemispherical ball 8 also typically comprises a material that is more durable and the material of hemispherical race 7. In such embodiments, the hemispherical ball 8 is less subject to wear and deformation than the hemispherical race 7. Proper selection of materials ensures that the hemispherical race 7 is the chosen wear surface while the hemispherical ball maintains its structure and form during use. According to some aspects, the hemispherical ball 8 comprises a metal such as but not limited to polished stainless steel or other polished metal. Material selection of the hemispherical ball 8 and the hemispherical race 7 may be unique to the desired outcome of the suspension mounting system. According to some aspects, both the hemispherical race 7 and the hemispherical ball 8 comprise low friction coefficient materials that interact well with each other during movement.

Although not required in all embodiments, a suspension mounting system may further comprise a cup 12 mounted within the first cavity 11 between the walls 23 of the first cavity 11 and the hemispherical race 7. The cup 12 typically comprises an elastomeric cup 12, but may alternatively comprise a metal or plastic cup. The cup is size and shaped complementary to the first cavity 11 such that cup 12 interfaces the walls 23 of the first cavity 11 when the cup 12 is mounted at least partially within the first cavity 11. According to some aspects, the rims of the cup 12 are substantially planar with the lower surface 15 of the housing 1 when the cup 12 is mounted within the first cavity 11.

Through use of an elastomeric cup 12 type bushing and selecting an appropriate material for this bushing, a user may fine-tune the amount of noise isolation the suspension mounting system provides. In some street application, more dampening may be desirable, in which case a softer and/or thicker elastomeric cup 12 may be used. In applications in which road feedback is desired, a firmer elastomeric cup 12 may be used or, alternatively, the system may forego use of an elastomeric cup 12.

One or more embodiments of a suspension mounting system further comprise a shock absorber shaft 2. Although FIG. 3 depicts a non-limiting embodiment of a shock absorber shaft 2, it is contemplated that any shock absorber shaft may be adapted for use with the suspension mounting systems disclosed herein.

According to some aspects, a shock absorber shaft 2 comprises a first coupling that is proximate the hemispherical ball 8 when the system is assembled. The first coupling may comprise any of a variety of couplings, such as but not limited to locking nuts, pins, clamps, and the like. In the non-limiting embodiment depicted in FIG. 3, the first coupling comprises a lip 18 on the shock absorber shaft 2. The lip 18 is formed between a wide portion 20 and a narrow portion 19 of the shock absorber shaft 2. The lip 18 is typically configured to support, either directly or indirectly, the hemispherical ball 8. For example, in some embodiments, a portion of the lip interfaces with the hemispherical ball 8 and holds the hemispherical ball 8 against the hemispherical race 7. In other embodiments, however, a first washer 10 is positioned between the lip 18 and the hemispherical ball 8. In such embodiments, the lip 18 may interface a portion of the first washer 10 and the first washer 10 may interface a portion of the hemispherical ball 8, typically a planar portion 24. The first washer 10 may comprise a metal washer, a plastic washer, or any other washer known in the art.

When assembled, some embodiments of a suspension mounting system further comprise a wear gap 16 that is formed between the first washer 10 and at least one of the hemispherical race 7, the cup 12, and the lower surface 15 of the housing 1. The wear gap 16 is formed from extension of the hemispherical ball 8 beyond the lower surface 15 of the housing 1, the cup 12, and/or the hemispherical race 7. Because of this extension, the hemispherical ball 8 prevents the first washer 10 from contacting the lower surface 15 of the housing 1, the cup 12, and the hemispherical race 7. This in turn allows for movement of the shock absorber shaft without excess noise typically associated with interaction between a metal washer and a metal housing. Furthermore, as suspension mounting system is wear compensating because the wear gap 16 allows for significant wear on the hemispherical race 7 before the first washer 10 directly contacts the lower surface 15 of the housing 1, the cup 12, or the hemispherical race.

According to some aspects, the shock absorber shaft 2 extends through at least the washer (when present), the hemispherical ball 8, the hemispherical race 7, the cup 12 (when present) and the housing 1. Typically, the narrow portion 19 of the shock absorber shaft 2 extends through these parts of the suspension mounting system. In one or more embodiments, the housing 1 may further comprise a rim 17 extending outward from the lower surface 15 of the housing 1 and surrounding the first cavity 11. The rim 17 typically comprises a diameter greater than a diameter of the first metal washer 10 such that there is a space between the outer periphery of the metal washer and the inner periphery of the rim 17.

One or more embodiments of a suspension mounting system comprise a bushing 3 that surrounds a portion of the shock absorber shaft 2. In some aspects, the bushing 3 comprises a metal bushing 3 that surrounds the narrow portion 19 of the shock absorber shaft 2 and extends through the ball opening 22 of the hemispherical ball 8, the hemispherical race 7, the elastomeric cup 3, and the housing 1. The bushing is typically positioned between the first coupling and a second coupling on the shock absorber shaft 2. More particularly, the bushing 3 may be positioned between the first washer 10 and a second coupling on the shock absorber shaft 2.

In operation, as the shock absorber shaft 2 moves, the hemispherical ball 8 correspondingly slides against the hemispherical race 7. Because of the configuration of the disclosed suspension mounting system, neither the shock absorber shaft 2 nor the hemispherical ball 8 comes in direct contact with the housing 1 as shock absorber shaft 2 pivots or moves. Over time, because the hemispherical ball 8 is typically more durable and resistant to wear than the hemispherical race 7, the hemispherical race 7 gradually wears down from the friction between the hemispherical ball 8 and the hemispherical race 7. In embodiments wherein the first cavity 11 is facing downward, the suspension mounting system remains effective because the housing 1 housing at least partially pulls the hemispherical race 7 down against the hemispherical ball 8.

Although not required in all embodiments, some embodiments of a suspension mounting system may further comprise a second cavity 9 on an upper surface 14 of the housing 1 and a biasing element such as a bushing 6 positioned at least partially within the second cavity 9. The second cavity 9 is typically positioned directly opposite the first cavity 11 and the housing comprises a cavity channel 13 extending between the first cavity 11 and the second cavity 9. The cavity channel 13 is sized to allow the bushing 3 and the shock absorber shaft 2 to extend therethrough, usually with additional space between the outer periphery of the bushing 3 and the boundary of the cavity channel 13 such that the shock absorber shaft 2 may move within the cavity channel 13 without contacting the housing 1. In still other embodiments, a suspension system does not include a second cavity 9.

The biasing element may comprise a variety of biasing elements, such as but not limited to a spring or an elastomeric bushing 6. The bushing 6 typically comprises a bushing opening 21 extending through the bushing 6. The bushing opening 21 is sized and configured to allow the bushing 3 and/or a portion of the shock absorber shaft 2 to extend therethrough. According to some aspects, the bushing 6 comprises an elastomeric bushing 6, such as but not limited rubber or urethane. In other embodiments, the bushing 6 may comprise other plastics or rubbers.

The bushing 6 is mounted at least partially within the second cavity 6. According to some aspects, the bushing 6 is held between the second cavity 9 and a coupling on the shock absorber shaft 2 extending through the bushing 6. The coupling may comprise a locking nut 5 threadedly coupled the shock absorber shaft 2, a lip, a pin, and the like. More particularly, a second washer 4 may be positioned between the locking nut and the bushing 6. The second washer 4 may comprise any material, such as but not limited to a metal washer, a plastic washer, or any other washer known in the art. According to some aspects, the second washer 4 is sized to fit within the second cavity 9.

In one or more embodiments, the locking nut 5 may be rotated to compress the bushing 6. Compression of bushing 6 provides a preload and keeps the entire assembly tight. As described above, during use the hemispherical ball 8 pivots within the hemispherical race 7 and the hemispherical race 7 may experience wear. As the hemispherical race 7 wears, the elastomeric bushing 6 or other biasing element biases the hemispherical ball 8 deeper into the worn hemispherical race 8. The hemispherical ball 8 typically comprises a more durable material, such as metal, than the hemispherical race 7, and thus will travel deeper into the hemispherical race 7 as the hemispherical race 7 wears. As the hemispherical ball 8 moves deeper into the hemispherical race 7 due to the wear, the diameter and surface area of the hemispherical ball 8 in contact with the hemispherical race increases, resulting in the hemispherical ball being held securely within the hemispherical race 7. This configuration is advantageous to conventional suspension mounting systems because any looseness that would otherwise occur during wear is eliminated. Thus, some embodiments of a suspension mounting system contemplated herein are self-tightening.

Embodiments of suspension mounting systems contemplated in this disclosure have other advantages to conventional suspension mounting systems. For example, in some non-limiting embodiments, the shock absorber shaft 2 is substantially perpendicular to the ground when the suspension mounting system is in use. With the shock absorber shaft 2 substantially perpendicular to the ground, the hemispherical ball 8 is positioned below the hemispherical race 7. Accordingly, the concave configuration of the hemispherical race will be facing downward. This allows gravity to naturally prevent debris from falling into the concave hemispherical race 7, while also allowing gravity to drain or remove any debris.

Various embodiments of the suspension mounting systems contemplated as part of this disclosure may utility various materials to achieve varying objectives, such as but not limited to low cost, ride comfort, and/or firm handling.

Due to the modular design of some embodiments, a suspension mounting system of this disclosure may be provided in a kit with different components that would allow the end user or installer the ability to offer many different combinations of components to simply, easily, and inexpensively provide a variety of different performance attributes that are typically not available from convention suspension mounting systems.

Various examples of non-limiting embodiments of suspension mounting systems are provided below. Each of these embodiments is described for exemplary purposes only and not by way of limitation. In a first embodiments, a mounting suspension system comprises a metal housing 1, an elastomeric bushing 6, a hemispherical race 7 comprising a low friction material such as but not limited to Teflon or other plastic, a hemispherical ball 8 comprising a low friction material such as polished metal, metal tube bushing 3, washers 4, 10, and/or retaining clips. Optionally, an elastomeric cup 12 bushing may be utilized.

In an alternative embodiment, a suspension mounting system comprises a metal housing 1, an elastomeric bushing 6, a polished metal hemispherical race 7 such as bronze or other metal or alloy, a polished hemispherical metal ball 8 such as hardened stainless steel, a metal tube bushing 3, washers 4, 10, nuts 5, and retaining clips.

This particular non-limiting embodiment would offer a similar ride quality to a pillow ball mount design while providing one or more of the following unexpected benefits. A larger diameter hemispherical ball 8 provides a larger load-bearing surface, which will reduce wear compared to conventional spherical ball mounts. The larger hemispherical ball 8 also supports the load of the vehicle on both the top and bottom of the hemispherical ball 8 more than conventional spherical ball mounts that use a smaller ball. Such conventional spherical ball mounts typically support the vehicle's weight mostly on the outer edges of the smaller ball, thus causing greater stress on that outer surfaces and resulting in faster wear and faster failure of the conventional spherical compared to suspension mounting systems disclosed herein. The pre-loaded elastomeric bushing 6 also provides wear compensation to maintain a tight assembly for proper engagement of the hemispherical ball 8 to the hemispherical race 7. The pre-loaded elastomeric bushing 6 also prevents rattling if the hemispherical race 7 experiences any wear. As the hemispherical race 7 experiences wear, the oversized hemispherical ball 8 will be drawn deeper and tighter into the hemispherical race 7 due to the preload tension exerted by the top elastomeric bushing 6, resulting in a self-adjusting and self-tightening and wear-compensating system. The concave orientation of the metal hemispherical race 7 of this embodiment allows gravity to naturally repel debris and expel any debris.

This embodiment of a suspension mounting system also provides a longer operational life than conventional pillow ball and Eibach suspension mounting systems. Compact design of this embodiment allows it to be used in many applications while providing full shock travel. Manufacture and assembly costs of this and other embodiments re also lower than conventional suspension mounting systems. In addition, the modular components allow an end-installer and user to select components to provide the desired qualities. Suspension mounting systems according to some aspects of this disclosure are field configurable, upgradeable and repairable by installer and by the end user. Suspension mounting systems according to some aspects of this disclosure are quieter than spherical ball mounts in vehicles because there is no metal-to-metal contact between the shock absorber shaft 2 and the vehicle. Also contemplated as part of this disclosure is a method of providing additional noise and vibration abatement through the use of elastomeric cup 12 bushings of various durometers and thicknesses to adjust the amount of rigidity and vibration isolation desired.

Another non-limiting embodiment of a suspension mounting system comprises a metal housing 1, an elastomeric bushing 6, a polished metal hemispherical ball 8, a polished metal hemispherical race 7, a metal tube bushing 3, washers 4, 10, nut 5, and/or retaining clips. This embodiment may comprise any of the advantages provided elsewhere in this document when compared to conventional mounting systems.

Another non-limiting embodiment of a suspension mounting system comprises a metal housing 1, an elastomeric bushing 6, a plastic hemispherical race 7, a polished hemispherical metal ball 8, a metal tube bushing 3, washers 4, 10, nut 5 and/or retaining clips.

This embodiment may comprise any of the advantages provided elsewhere in this document when compared to conventional mounting systems.

Another non-limiting embodiment of suspension mounting system comprises a metal housing 1, an elastomeric bushing 6, an elastomeric cup 12, a plastic hemispherical race 7, a polished metal hemispherical ball 8, a metal tube bushing 3, washers 4, 10, nut 5 and/or retaining clips. This embodiment may comprise any of the advantages provided elsewhere in this document when compared to conventional mounting systems.

Another non-limiting embodiment of a suspension mounting system comprises a metal housing 1, a plastic hemispherical ball 7, a plastic hemispherical race 8, a metal tub bushing 3, washers 4, 10, nut 5 and/or retaining clips. This embodiment may comprise any of the advantages provided elsewhere in this document when compared to conventional mounting systems. In particular, this embodiment offers improved ride quality and noise isolation when compared with conventional suspension mounting systems.

Another non-limiting embodiment of a suspension mounting system comprises a metal housing 1, an elastomeric bushing 6, an elastomeric cup 12, a plastic hemispherical race 7, a plastic hemispherical ball 8, metal bushing 3, washers 4, 10 and/or retaining clips. This embodiment may comprise any of the advantages provided elsewhere in this document when compared to conventional mounting systems. In particular, this embodiment offers improved ride quality and noise isolation when compared with conventional suspension mounting systems.

Other benefits of one or more of the suspension mounting systems contemplated in this disclosure may include one or more of the following. Modular configurations of some embodiments allow an installer and or user to select components to alter the performance characteristics of the assembly. According to some aspects, wear characteristics of the suspension mounting system are controlled. In some embodiments, a hemispherical ball 8 is more durable and wears slower than the hemispherical race 7. As the hemispheric race 7 wears, the assembly is self-adjusting/self-tightening to compensate for the wear. Suspension mounting systems disclosed herein are typically lower-cost to manufacture than conventional suspension mounting systems. Suspension mounting systems contemplated herein may be upgradeable and repairable in the field, inexpensive to repair and/or replace, and have a longer operational life. Suspension mounting systems disclosed herein may also comprise a stronger design than conventional spherical ball suspension mounting systems, due to larger load bearing surfaces.

One suspension mounting system may be positioned within a mounting plate and not below it, as is required with the Eibach system. Moreover, the hemispherical race 7 is typically self-draining and self-cleaning. Embodiments comprising an elastomeric cup allow for noise and vibration insulation. Suspension mounting systems according to some aspects may hold a shock absorber shaft 2 more securely than other mount designs, which only use rubber bushings. One or more suspension mounting systems may offer more precise control and handling than all rubber mounts.

It will be understood that implementations are not limited to the specific components disclosed herein, as virtually any components consistent with the intended operation of a method and/or system implementation for suspension mounting systems may be utilized. Accordingly, for example, although particular suspension mounting systems may be disclosed, such components may comprise any shape, size, style, type, model, version, class, grade, measurement, concentration, material, weight, quantity, and/or the like consistent with the intended operation of a method and/or system implementation for a suspension mounting system may be used.

In places where the description above refers to particular implementations of suspension mounting systems, it should be readily apparent that a number of modifications may be made without departing from the spirit thereof and that these implementations may be applied to other suspension mounting systems. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A suspension mounting system, comprising:
   a housing comprising a first cavity;
   a hemispherical race mounted within the first cavity;
   a hemispherical ball slidably mounted at least partially within the hemispherical race;
   a first washer proximate the hemispherical ball, wherein the hemispherical ball is sized such that the first washer does not directly contact either the hemispherical race or the housing and a wear gap is formed between the washer and the housing and between the washer and the hemispherical race; and
   a shock absorber shaft extending through the first cavity of the housing, the hemispherical race, the hemispherical ball, and the first washer, wherein the hemispherical ball pivots within the hemispherical race responsive to movement of the shock absorber;
   wherein the first washer is positioned between a coupling on the shock absorber and the hemispherical ball, the suspension mounting system further comprising a second cavity on the housing opposite the first cavity, an elastomeric first bushing positioned at least partially within the second cavity, wherein the shock absorber shaft extends through the second cavity, the elastomeric first bushing, and the coupling; and
   wherein the coupling comprises a locking nut and the suspension mounting system further comprises a second washer between the elastomeric first bushing and the locking nut, and a second bushing positioned directly between the first washer and the second washer, wherein the shock absorber shaft extends through the second bushing and the second washer.

2. The suspension mounting system of claim 1, further comprising a cup mounted within the first cavity between walls of the first cavity and the hemispherical race.

3. The suspension mounting system of claim 2, wherein the hemispherical ball is formed of a more durable material than the hemispherical race.

4. The suspension mounting system of claim 2, wherein the hemispherical ball comprises a metal hemispherical ball, the hemispherical race comprises a plastic hemispherical race, the housing comprises a metal housing, the second bushing comprises a metal second bushing, and the cup comprises an elastomeric cup, and wherein the elastomeric bushing biases the metal spherical ball against the plastic hemispherical race as the plastic hemispherical race wears down.

5. The suspension mounting system of claim 2, wherein the hemispherical ball comprises a metal hemispherical ball, the hemispherical race comprises a metal hemispherical race, the housing comprises a metal housing, the second bushing comprises a metal second bushing, and the cup comprises an elastomeric cup, and wherein the elastomeric bushing biases the metal spherical ball against the metal hemispherical race as the plastic hemispherical race wears down.

6. The suspension mounting system of claim 2, wherein the hemispherical ball comprises a plastic hemispherical ball, the hemispherical race comprises a plastic hemispherical race, the housing comprises a metal housing, the second bushing comprises a metal second bushing, and the cup comprises an elastomeric cup, and wherein the elastomeric bushing biases the metal spherical ball against the plastic hemispherical race as the plastic hemispherical race wears down.

7. A mounting system, comprising:
a housing comprising two opposing cavities;
a hemispherical race mounted within a first cavity of the two opposing cavities;
a hemispherical ball slidably mounted at least partially within the hemispherical race;
an elastomeric first bushing positioned at least partially within a second cavity of the two opposing cavities;
a shaft extending through the two opposing cavities, the hemispherical race, the hemispherical ball, and the elastomeric first bushing, wherein the hemispherical ball pivots within the hemispherical race responsive to movement of the shaft;
a locking nut threadedly coupled to the shaft proximate the elastomeric bushing;
a lip on the shaft proximate the hemispherical ball;
a first washer positioned directly between the lip of the shaft and the hemispherical ball;
a second washer positioned between the locking nut and the elastomeric first bushing; and
a second bushing positioned between the first and second washers and extending through the elastomeric first bushing, the housing, and the hemispherical ball;
wherein the shaft extends through the first washer, the second washer, and the second bushing; and wherein the locking nut and the lip are positioned to hold the first washer, the second washer, the hemispherical race, the hemispherical ball, and the elastomeric first bushing between the them.

8. The mounting system of claim 7, wherein the hemispherical ball is sized such that the first washer does not directly contact the housing or the hemispherical race and a wear gap is formed between the first washer and the housing and between the first washer and the hemispherical race.

9. The mounting system of claim 7, further comprising a cup positioned at least partially within the first cavity between the hemispherical race and walls of the first cavity.

10. The mounting system of claim 7, wherein the hemispherical ball is formed of a material that is more durable than material forming the hemispherical race.

11. The mounting system of claim 7, wherein the hemispherical ball comprises a metal hemispherical ball, the hemispherical race comprises a plastic hemispherical race, the housing comprises a metal housing, the second bushing comprises a metal second bushing, and the cup comprises an elastomeric cup, and wherein the elastomeric bushing biases the metal spherical ball against the plastic hemispherical race as the plastic hemispherical race wears down.

12. The mounting system of claim 7, wherein the hemispherical ball comprises a metal hemispherical ball, the hemispherical race comprises a metal hemispherical race, the housing comprises a metal housing, the second bushing comprises a metal second bushing, and the cup comprises an elastomeric cup, and wherein the elastomeric bushing biases the metal spherical ball against the metal hemispherical race as the plastic hemispherical race wears down.

13. The mounting system joint of claim 7, wherein the hemispherical ball comprises a plastic hemispherical ball, the hemispherical race comprises a plastic hemispherical race, the housing comprises a metal housing, the second bushing comprises a metal second bushing, and the cup comprises an elastomeric cup, and wherein the elastomeric bushing biases the metal spherical ball against the plastic hemispherical race as the plastic hemispherical race wears down.

14. A mounting system, comprising:
a housing comprising a first cavity;
a hemispherical race mounted within the first cavity;
a hemispherical ball slidably mounted at least partially within the hemispherical race, the hemispherical ball being formed of a material that is harder than a material forming the hemispherical race;
a biasing element positioned proximate the housing opposite the first cavity; and
a shaft extending through the first cavity, the hemispherical race, the hemispherical ball, and the housing, the shock absorber shaft comprising a first coupling configured to direct the hemispherical ball into the hemispherical race and a second coupling proximate the biasing element, wherein as the hemispherical race wears responsive to friction between the hemispherical race and the hemispherical ball, the biasing element biases the hemispherical ball against the hemispherical race;
a first washer positioned directly between the first coupling of the shaft and the hemispherical ball;
a second washer positioned between the second coupling and the biasing element; and
a bushing positioned between the first and second washers and extending through the biasing element, the housing, and the hemispherical ball;
wherein the shaft also extends through the first washer, the second washer, and the bushing; and wherein the first coupling and the second coupling are positioned to hold the first washer, the second washer, the hemispherical race, the hemispherical ball, and the biasing element between the them.

15. The suspension mounting system of claim 14, wherein the biasing element comprises an elastomeric bushing positioned at least partially within a second cavity of the housing.

* * * * *